US009140404B1

(12) United States Patent  
Akrep (10) Patent No.: US 9,140,404 B1  
(45) Date of Patent: Sep. 22, 2015

(54) RIGGING SYSTEM ADAPTOR

(71) Applicant: Polar Focus, Inc., South Deerfield, MA (US)

(72) Inventor: Michael J. Akrep, Greenfield, MA (US)

(73) Assignee: POLAR FOCUS, INC., South Deerfield, MA (US)

( * ) Notice: Subject to any disclaimer, the term of this patent is extended or adjusted under 35 U.S.C. 154(b) by 0 days.

(21) Appl. No.: 14/226,906

(22) Filed: Mar. 27, 2014

Related U.S. Application Data (60) Provisional application No. 61/805,980, filed on Mar. 28, 2013.

(51) Int. Cl.  
*A47H 1/10* (2006.01)  
*F16M 11/18* (2006.01)  
*F16M 11/12* (2006.01)  
*F16M 11/04* (2006.01)

(52) U.S. Cl.  
CPC .............. *F16M 11/18* (2013.01); *F16M 11/12* (2013.01); *F16M 11/04* (2013.01)

(58) Field of Classification Search  
USPC .......................... 248/646, 657, 323, 637, 645  
See application file for complete search history.

(56) References Cited

U.S. PATENT DOCUMENTS

| | | | | |
|---|---|---|---|---|
| 4,604,027 | A * | 8/1986 | Becker et al. | 414/749.1 |
| 5,746,567 | A * | 5/1998 | Herbermann et al. | 414/749.6 |
| 7,032,871 | B1 * | 4/2006 | Akrep | 248/323 |
| 2004/0238473 | A1 * | 12/2004 | McKay | 212/315 |
| 2014/0157915 | A1 * | 6/2014 | Gross et al. | 73/864.01 |

* cited by examiner

*Primary Examiner* — Kristina Junge  
(74) *Attorney, Agent, or Firm* — Doherty, Wallace, Pillsbury & Murphy, P.C.

(57) ABSTRACT

A rigging system adaptor which creates an infinite number of adjustability positions for a line array, wherein the adaptor is particularly well suited for use with a spine frame. The adaptor comprises a main frame having a longitudinally extending body to which a first attachment member, a second attachment member, and a mount are attached. The first attachment member may be fixed onto the main frame via a pair of lateral rods, wherein the lateral rods are oppositely situated from each other relative to the main frame. The second attachment member and the mount may be slidably engaged with the lateral rods such that they can move along the main frame and can be repositioned to meet the specific needs of a user.

15 Claims, 5 Drawing Sheets

RIGGING SYSTEM ADAPTOR

BACKGROUND OF THE INVENTION

1. Field of the Invention

The invention relates to an adaptor for a rigging system for a line array. More particularly, the invention relates to an adaptor for a rigging system, wherein the adaptor allows for pan and tilt control of a line array while under load.

2. Background of the Invention

Frames for mounting line arrays are well known. One such frame is a front to back spine support frame. Such a frame either has no adjustable support and load points, or such adjustment is for standard increments and does not allow for adjustments to suit a particular need. As support points on conventional frames do not have infinite adjustability, it is extremely difficult, if not impossible, to alter the pan and tilt control of the line array while under load.

BRIEF SUMMARY OF THE INVENTION

The above described deficiencies of the prior art are cured or alleviated by an adaptor specially configured to provide an infinite number of adjustable tilt controls to a line array, wherein the line array has a common front to back spine support frame configuration.

These and other features and advantages of the present invention will be more fully understood from a reading of the following detailed description with reference to the accompanying drawings.

DETAILED DESCRIPTION OF THE INVENTION

The rigging system adaptor disclosed herein is specially designed for installation or portable use, and provides infinitely adjustable tilt control to a line array with the common front to back spine support frame configuration. In general, the rigging system adaptor comprises a main frame having a longitudinally extending body. The body terminates at an anterior terminal end and at an oppositely situated posterior terminal end. The body of the main frame further has arranged at respective opposite lateral sides thereof, a longitudinally extending proximal rod and a longitudinally extending distal rod. The adaptor further comprises a first abutment member and a second abutment member both of which are disposed forward of the anterior terminal end of the body of the main frame.

The adaptor further comprises a first attachment member which comprises a plate that abuts the posterior end of the main frame, and which is secured to a posterior terminal end of each of the proximal rod and the distal rod. The posterior attachment member further comprises a flange which abuts an underside of the main frame and which extends therefrom. The flange comprises a throughway through which a shackle may be secured to attach the adaptor to a frame.

The adaptor further comprises a second attachment member which comprises a sleeve which is disposed around the main frame. The second attachment member further comprises a flange. The flange of the second attachment member comprises a throughway through which a shackle may be secured to attach the adaptor to the frame. The second attachment member further comprises a proximal engagement member which is oriented along a proximal side of the sleeve, and a distal engagement member which is oriented along a distal side of the sleeve, wherein the longitudinally extending proximal rod is received within the proximal engagement member and the longitudinally extending distal rod is received within the distal engagement member.

The adaptor further comprises a pair of proximal bolts, wherein the bolts from the pair are arranged on opposite sides of the proximal engagement member and are engaged with the proximal rod; and a pair of distal bolts, wherein the distal bolts from the pair are arranged on opposite sides of the distal proximal engagement member and are engaged with the distal rod. When the pair of proximal bolts and the pair of distal bolts are tightened, the second attachment member is fixed in position; whereas, when the pair of proximal bolts and the pair of distal bolts are loosened, the second attachment member may be moved relative to the main frame to thereby adjust its position.

The adaptor further comprises a mount to which a load is attached. In an exemplary embodiment, the mount comprises a sleeve which is disposed around the main frame. The mount further comprises a proximal engagement member disposed on a proximal lateral side of the sleeve, and a distal engagement member disposed on a distal lateral side of the sleeve, wherein the proximal lateral rod is received within the proximal engagement member of the mount, and the distal lateral rod is received within the distal engagement member of the mount.

In another exemplary embodiment, the mount comprises a sleeve which is disposed between a first and second frame. The first and second frames are disposed around the main frame such that the sleeve of the mount is raised relative to the main frame and to the first and second frames.

The adaptor further comprises a pair of proximal bolts, wherein the bolts from the pair are arranged on opposite sides of the proximal engagement member of the mount and are engaged with the proximal rod; and a pair of distal bolts, wherein the distal bolts from the pair are arranged on opposite sides of the distal proximal engagement member of the mount and are engaged with the distal rod. When the pair of proximal bolts and the pair of distal bolts are tightened, the mount is fixed in position; whereas, when the pair of proximal bolts and the pair of distal bolts are loosened, the mount may be moved relative to the main frame to thereby adjust its position.

The mount may further comprise a clamping mechanism to further secure the mount to the main frame and/or to secure a load to the mount. In an exemplary embodiment, the clamping mechanism is engaged with the sleeve of the mount.

An exemplary rigging system adaptor shall now be described with reference to the figures, wherein it is to be understood that the adaptor shall not be limited to such description, but shall include all obvious modifications and variations thereto as would occur to one of ordinary skill in the art upon reading the present description.

An exemplary rigging system adaptor 10 comprises a main frame 12. Main frame 12 comprises a longitudinally extending upper side 14 opposite to a longitudinally extending underside 16, wherein upper side 14 and underside 16 respectively terminate at an anterior terminal end 13 and 15, and at a posterior terminal end 17 and 19. Main frame 12 further comprises a longitudinally extending proximal lateral side wall 18 opposite to a longitudinally extending distal lateral side wall 20, wherein proximal lateral side wall 18 and distal lateral side wall 20 respectively terminate at an anterior terminal end 21 and 23, and at a posterior terminal end 25 and 27. Anterior terminal ends 13 and 15 are attached at an approximate 90 degree angle to anterior terminal ends 21 and 23, while posterior terminal ends 17 and 19 are attached at an approximate 90 degree angle to posterior terminal ends 25 and 27 to form an anterior end 22 oppositely situated to a posterior end 24. Directed towards anterior end 22, upper side 14 and underside 16 each comprises a hole (not shown) formed therein, wherein a bolt 29 may be secured therethrough.

Adaptor 10 further comprises a first attachment member 30 which abuts a posterior region of main frame 12, and a second attachment member 60 which is slidably engaged with main frame 12.

First attachment member 30 comprises a plate 32 which abuts posterior end 24. More particularly, plate 32 has a front side 34 opposite to a back side 36, a top side 38 opposite to a bottom side 40, and a proximal lateral wall 42 opposite to a distal lateral wall 44. Back side 36 of plate 32 directly abuts posterior terminal ends 17, 19, 25, and 27 of main frame 12 such that top side 38 of plate 32 is level with upper side 14 of main frame 12, such that bottom side 40 of plate 32 extends towards and past underside 16 of main frame 12, such that proximal lateral wall 42 extends by and past posterior terminal end 25 of proximal lateral side wall 18, and such that distal lateral wall 44 extends by and past posterior terminal end 27 of distal lateral side wall 20. Plate 32 further comprises a hole 33 and a hole 35, wherein each of holes 33 and 35 is formed through front and back sides 34 and 36 of plate 12.

First attachment member 30 further comprises a flange member 46. Flange member 46 comprises a front side 48 oppositely situated from a back side 50, wherein front and back sides 48 and 50 terminate at a top side 52 and at a distal lateral side 54, wherein top side 52 and distal lateral side 54 are approximately perpendicularly situated to one another. Distal lateral side 54 abuts back side 36 of plate 32, and top side 52 is directed towards underside 16 of main frame 12. Flange member 46 further comprises a throughway 56 which is formed through front side 48 and back side 50.

Second attachment member 60 comprises a sleeve 62, a proximal engagement member 74, a distal engagement member 76, and a flange member 84. Sleeve 62 comprises a top wall 64 oppositely situated to a bottom wall 66, a proximal lateral wall 68 oppositely situated to a distal lateral wall 70, wherein top wall 64, bottom wall 66, proximal lateral wall 68, and distal lateral wall 70 surround an opening 72, wherein the anterior portion of main frame 12 is received within opening 72.

Each of proximal engagement member 74 and distal engagement member 76 comprises a generally cylindrical-shaped body 78 which comprises an anterior terminal end 79 oppositely situated to a posterior terminal end 81. Additionally, body 78 further comprises an exterior side 80 oppositely situated to an interior side (not shown), wherein the interior side surrounds an opening 82. Exterior side 80 of proximal engagement member 74 and exterior side 80 of distal engagement member 76 are respectively secured lengthwise to proximal lateral wall 68 and to distal lateral wall 70 of sleeve 62 of second attachment member 60.

Second attachment member 60 further comprises a pair of proximal nuts 83 and a pair of distal nuts 85. A nut from pair 83 is directed towards anterior terminal end 79 of proximal engagement member 74, and the other nut from pair 83 is directed towards posterior terminal end 81 of proximal engagement member 74. A nut from pair 85 is directed towards anterior terminal end 79 of distal engagement member 76, and the other nut from pair 85 is directed towards posterior terminal end 81 of distal engagement member 76.

Flange member 84 of second attachment member 60 comprises a front side 86 opposite to a back side 88, wherein a throughway 90 is formed between front side 86 and back side 88. Front side 86 and back side 88 are bordered by a top side 92, wherein top side 92 is joined to bottom wall 66 of sleeve 62 and extends downwards therefrom.

Rigging system adaptor 10 further comprises a mount 100 disposed around main frame 12. Mount 100 comprises a sleeve 101 having a top wall 102 opposite to a bottom wall 104, and a proximal lateral wall 106 opposite to a distal lateral wall 108, wherein an opening 110 is formed between top wall 102, bottom wall 104, proximal lateral wall 106, and distal lateral wall 108. A threaded hole 112 is formed through proximal lateral wall 106, and a threaded hole 114 is formed through distal lateral wall 108, wherein hole 112 is aligned with hole 114. A clamping mechanism 116 is inserted through holes 112 and 114 to thereby adjustably secure sleeve 101 to main frame 12 and/or to secure a load to mount 100, wherein clamping mechanism 116 comprises a knob 118 secured to a threaded bolt 120, and a washer 122 disposed on threaded bolt 120 and between knob 118 and proximal lateral wall 106, and a nut 124 disposed on threaded bolt 120 and abutting distal lateral wall 108 of sleeve 101.

Mount 100 further comprises a proximal engagement member 126 and a distal engagement member 128. Each of proximal engagement member 126 and distal engagement member 128 comprises a generally cylindrical-shaped body 130 having an anterior terminal end 133 oppositely situated from a posterior terminal end 135. Body 130 further comprises an exterior side 132 oppositely situated to an interior side (not shown), wherein the interior side surrounds an opening 134. Exterior side 132 of proximal engagement member 126 and exterior side 132 of distal engagement member 128 are respectively secured lengthwise to proximal lateral wall 106 and to distal lateral wall 108 of sleeve 101 of mount 100.

Mount 100 further comprises a pair of proximal nuts 129 and a pair of distal nuts 131. A nut from pair 129 is directed towards anterior terminal end 133 of proximal engagement member 126, and the other nut from pair 129 is directed towards posterior terminal end 135 of proximal engagement member 126. A nut from pair 131 is directed towards anterior terminal end 133 of distal engagement member 128, and the other nut from pair 131 is directed towards posterior terminal end 135 of distal engagement member 128.

Rigging system adaptor 10 further comprises a longitudinally extending proximal lateral rod 140 and a longitudinally extending distal lateral rod 142, wherein each of rods 140 and 142 comprises a generally cylindrical-shaped body 144 which terminates at an anterior terminal end 146 and at an oppositely situated posterior terminal end 148.

Proximal lateral rod 140 is received within opening 82 of proximal engagement member 74, within opening 134 of proximal engagement member 126, and within pair of proximal nuts 83 and pair of proximal nuts 129; while posterior terminal end 148 of proximal lateral rod 140 is attached to plate 32 of first attachment member 30 via a screw 150 received within hole 33. Anterior terminal end 146 of proximal lateral rod 140 is received within a via 162 formed through a plate 160, and secured thereto via a screw 164, wherein plate 160 is positioned forward of anterior end 22 of main frame 12.

Similarly, distal lateral rod 142 is received within opening 82 of distal engagement member 76, within opening 134 of distal engagement member 128, and within pair of distal nuts 85 and pair of distal nuts 131; while posterior terminal end 148 of distal lateral rod 142 is attached to plate 32 of first attachment member 30 via a screw 166 received within hole 35. Anterior terminal end 146 of distal lateral rod 142 is received within a via 170 formed through a plate 168, and secured thereto via a screw 172, wherein plate 168 is positioned forward of anterior end 22 of main frame 12, and which is in parallel alignment with plate 160.

As would be obvious to one of ordinary skill in the art from reading the above disclosure, second attachment member 60 and mount 100 may be releasably secured to main frame 12 via the respective use of pair of nuts 83 and 85 and pair of nuts 129 and 131. When pair of nuts 83 and 85 and pair of nuts 129 and 131 are loosened, respective second attachment member 60 and mount 100 may be moved along main frame 12 thereby changing the position of second attachment member 60 and mount 100 in relation to main frame 12; however, when pair of nuts 83 and 85 and pair of nuts 129 and 131 are tightened, respective second attachment member 60 and mount 100 may be secured in place relative to main frame 12.

Figure 1:
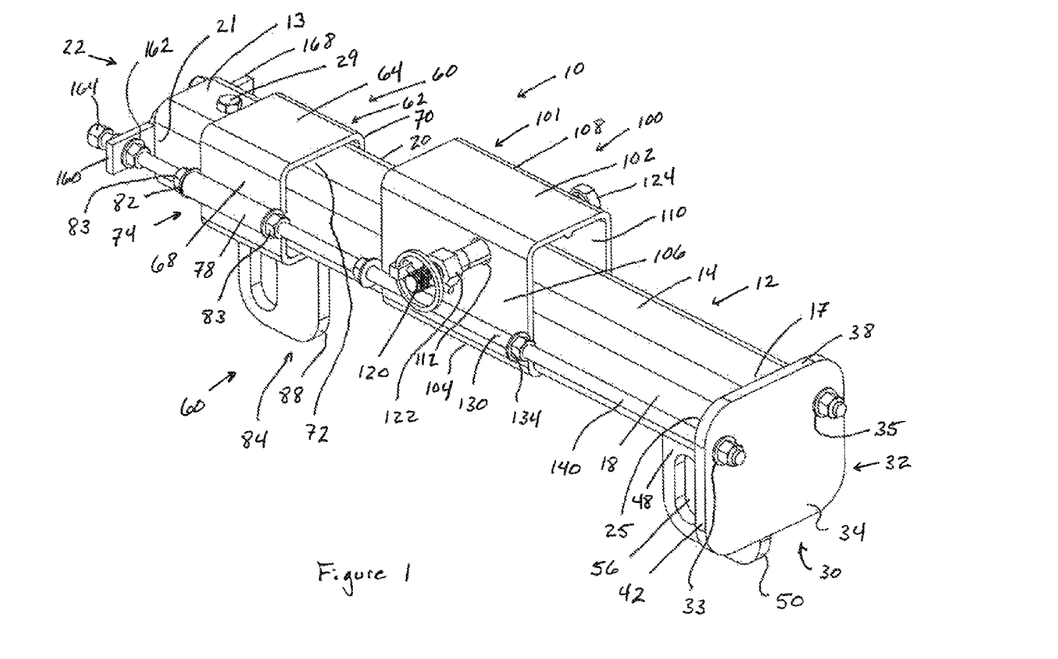
FIG. 1 is an aerial perspective view of an exemplary rigging system adaptor.
Figure 2:
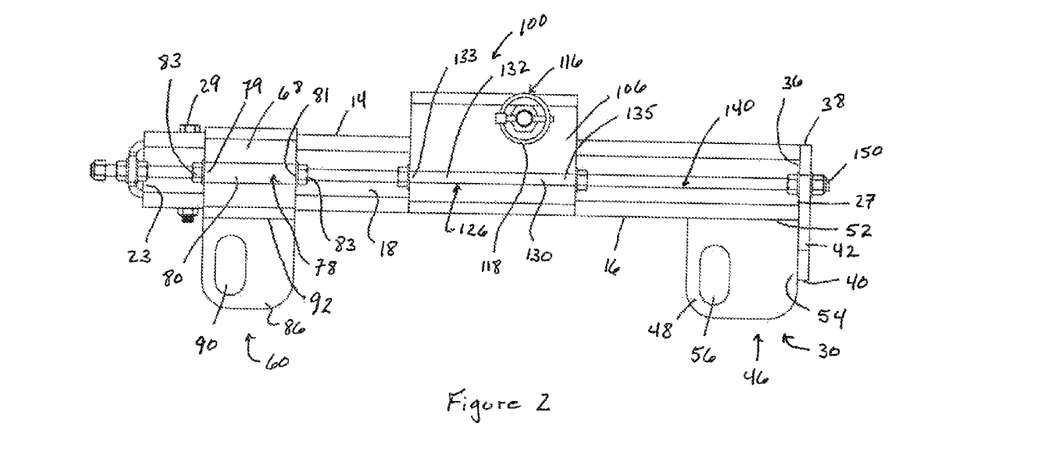
FIG. 2 is a schematic depicting a side view of the rigging system adaptor depicted in FIG. 1.
Figure 3:
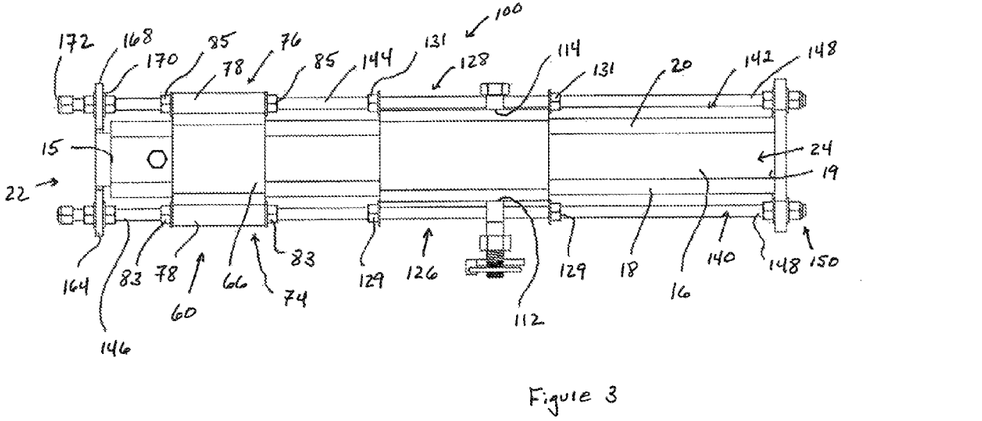
FIG. 3 is a schematic depicting a bottom side of the rigging system adaptor depicted in FIG. 1.
Figure 4:
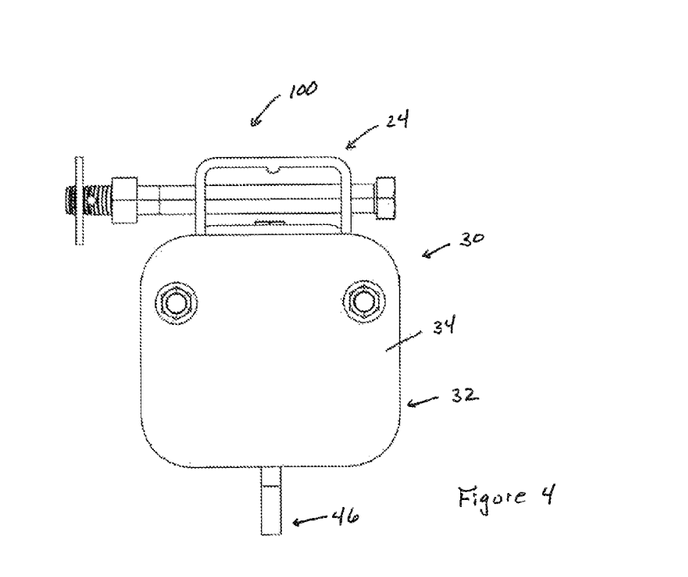
FIG. 4 is a schematic depicting a posterior end view of the rigging system adaptor depicted in FIG. 1.
Figure 5:
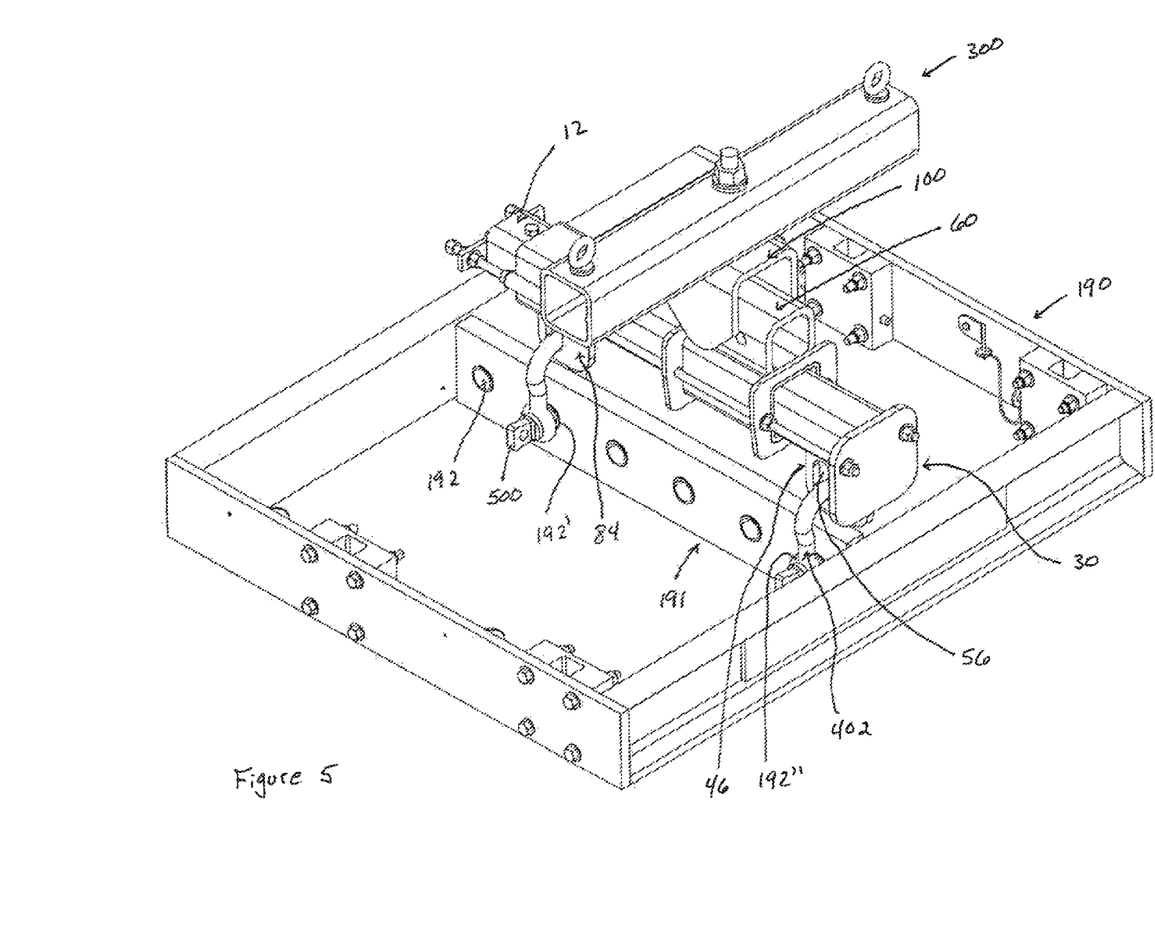
FIG. 5 is a schematic depicting an exemplary apparatus comprising the rigging system adaptor depicted in FIGS. 1-4.
Figure 6:
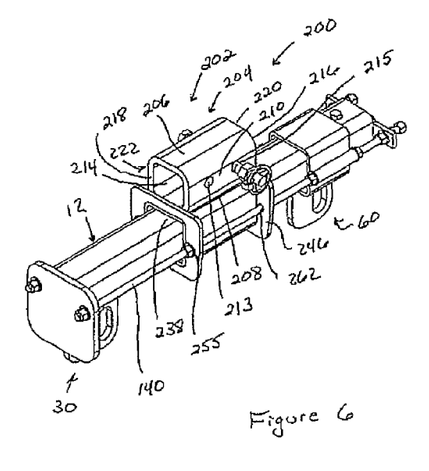
FIGS. 6-9 is a schematic depicting another exemplary rigging system adaptor.
Figure 7:
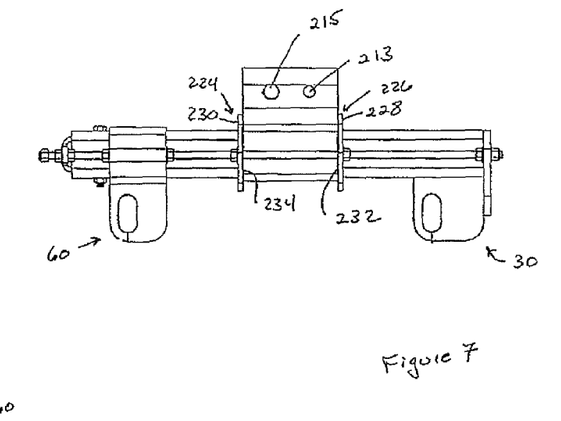
Figure 8:
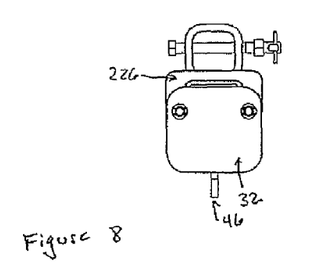
Figure 9:
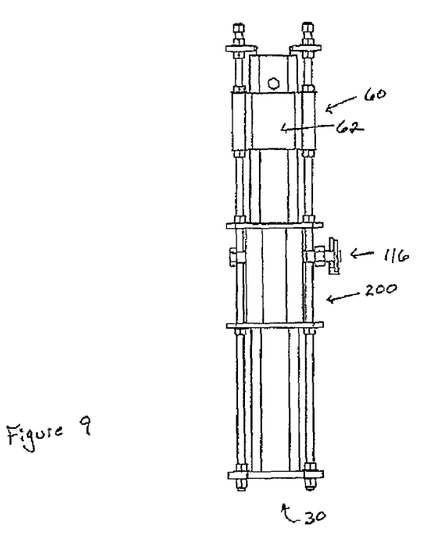

Referring to FIG. 5, an exemplary use of rigging system adaptor 10 is in the securement of adaptor 10 to an exemplary line array frame 190 and to an exemplary load 300. Here, frame 190 comprises a linear beam 191 having a plurality of holes 192 formed therethrough. A U-shaped shackle 400 is inserted through throughway 90 of flange member 84 of second attachment member 60 while the terminal ends of U-shaped shackle 400 sandwich a hole 192' from plurality 192 and are secured thereto via a bolt 500 which is disposed between the terminal ends of U-shaped shackle 400 and hole 240'. Additionally, a U-shaped shackle 402 is inserted through throughway 56 of flange member 46 of first attachment member 30 while the terminal ends of U-shaped shackle 402 sandwich a hole 192" from plurality 192 and are secured to frame 190 via a bolt 502 which is disposed between the terminal ends of U-shaped shackle 402 and hole 192". Additionally, load 300 is secured to mount 100.

The position of second attachment member 60 relative to linear beam 191 may be adjusted through the release and tightening of pairs of nuts 83 and 85, wherein the release allows second attachment member 60 to be slidably engaged with proximal lateral rod 140 and with distal lateral rod 142, and the tightening of pairs of nuts 83 and 85 locks second attachment member 60 to proximal lateral rod 140 and to distal lateral rod 142. Additionally, the position of load 300 relative to linear beam 191 may be adjusted though the release and tightening of pairs of nuts 129 and 131, wherein the release allows mount 100 to be slidably engaged with proximal lateral rod 140 and with distal lateral rod 142, and the tightening of pairs of nuts 129 and 131 locks mount 100 to proximal lateral rod 140 and to distal lateral rod 142.

FIGS. 6-10 depict an exemplary rigging system adaptor 200. Rigging system adaptor 200 comprises main frame 12, first attachment member 30, second attachment member 60, proximal lateral rod 140, and distal lateral rod 142, all as described above with reference to FIGS. 1-5. However, in lieu of mount 100, adaptor 200 comprises a mount 202.

Mount 202 comprises a sleeve 204 having a top side 206 oppositely situated to a bottom side 208, a proximal lateral side 210 oppositely situated to a distal lateral side 212, and an anterior-directed wall 220 oppositely situated to a posterior-directed wall 222. An opening 216 is formed through anterior-directed wall 220 and an opening 218 is formed through posterior-directed wall 222, wherein openings 216 and 218 lead into a channel 214 formed through sleeve 204. Additionally, each of proximal lateral side 210 and distal lateral side 212 has a hole 213 and a hole 215 formed therethrough.

Mount 202 further comprises clamping mechanism 116 as described above with reference to FIGS. 1-4, wherein clamping mechanism 116 is inserted through holes 215 of proximal and distal lateral sides 210 and 212, to thereby adjustably secure sleeve 204 to main frame 12 and/or to secure a load to mount 202.

Mount 202 further comprises an anterior frame 224 and a posterior frame 226. Each of anterior and posterior frames 224 and 226 comprises a respective front wall 228 and 230 oppositely situated to a respective back wall 232 and 234, and has a respective opening 236 and 238 formed through front walls 228 and 230 and back walls 232 and 234. Opening 236 divides anterior frame 224 into an upper wall 240 oppositely situated to a lower wall 242, and a lateral wall 244 oppositely situated to a lateral wall 246. Similarly, opening 238 divides posterior frame 226 into an upper wall 248 oppositely situated to a lower wall 250, and a lateral wall 252 oppositely situated to a lateral wall 254. A hole 256 is formed through lateral wall 244, a hole 258 is formed through lateral wall 246, a hole 260 is formed through lateral wall 252, and a hole 262 is formed through lateral wall 254.

Back wall 232 of anterior frame 224 abuts anterior-directed wall 220 and extends therefrom past bottom side 208 without obstructing channel 214, while back wall 234 of posterior frame 226 abuts posterior-directed wall 222 and extends therefrom past bottom side 208 without obstructing channel 214.

Main frame 12 is received by and disposed through openings 236 and 238 of respective frames 224 and 226 such that bottom side 208 of mount 202 is disposed on upper side 14 of main frame 12. Additionally, proximal lateral rod 140 extends through holes 258 and 262 while distal lateral wall 142 extends through holes 256 and 260 to hold mount 202 to main frame 12, and nuts 255 are used to fix mount 202 to main frame 12.

Figure 10:
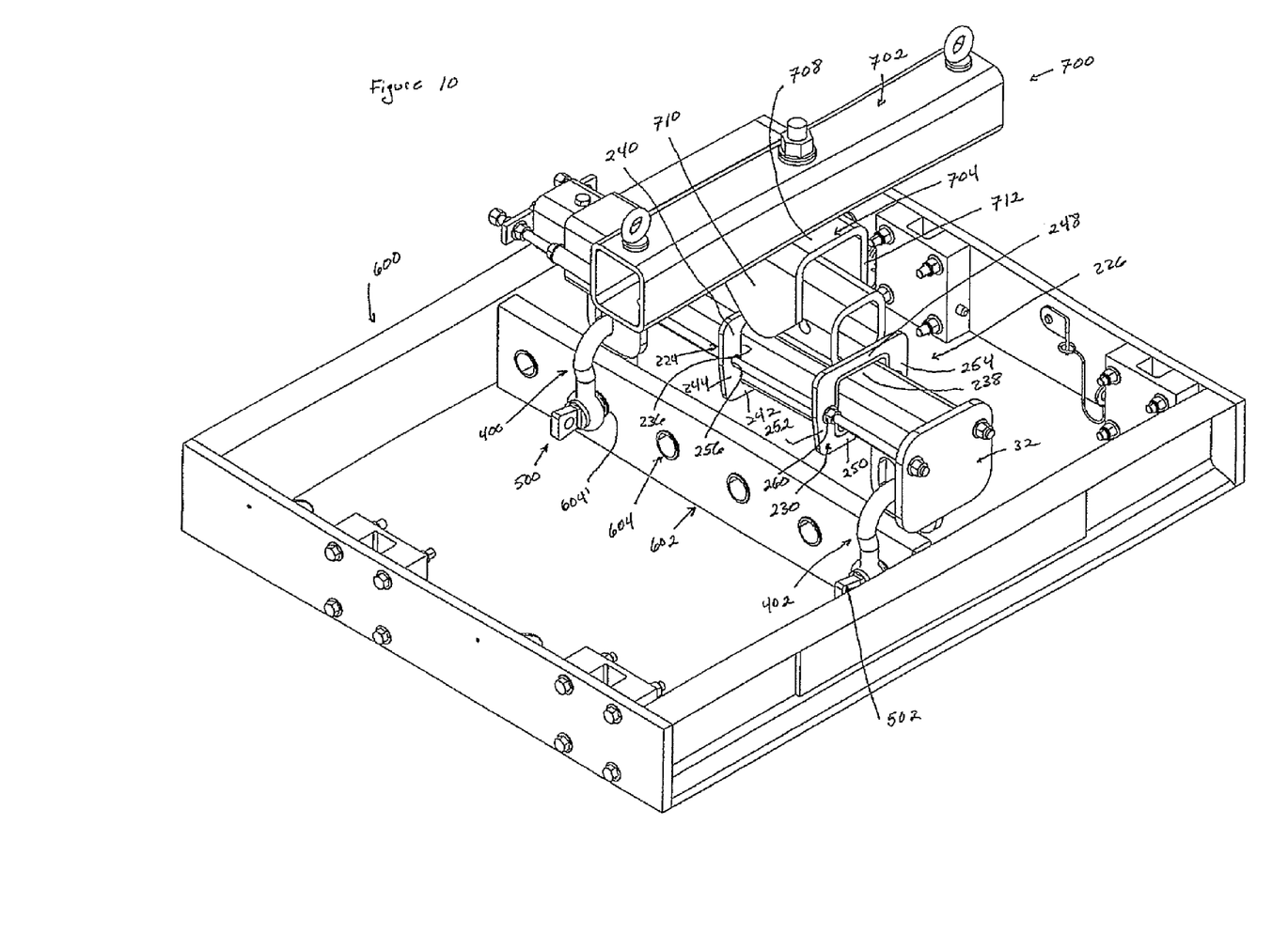
FIG. 10 is a schematic depicting an exemplary apparatus comprising the rigging system adaptor depicted in FIGS. 6-9.

Referring to FIG. 10, an apparatus 300 comprises rigging system adaptor 200, a line array frame 600, and a load 700, wherein rigging system adaptor 200 is used to secure load 700 to line array frame 600. Line array frame 600 comprises a linear beam 602 having a plurality of holes 604 formed therethrough. A U-shaped shackle 400 is inserted through throughway 90 of flange member 84 of second attachment member 60 while the terminal ends of U-shaped shackle 400 sandwich a hole 604' from plurality 604 and are secured thereto via a bolt 500 which is disposed between the terminal ends of U-shaped shackle 400 and hole 604'. Additionally, a U-shaped shackle 402 is inserted through throughway 56 of flange member 46 of first attachment member 30 while the terminal ends of U-shaped shackle 402 sandwich a hole 604" from plurality 604 and are secured to beam 602 via a bolt 502 which is disposed between the terminal ends of U-shaped shackle 402 and hole 192".

Load 700 comprises a beam 702 disposed on and secured to a sleeve 704. Sleeve 704 comprises a U-shaped body 706 comprising a top side 708 flanked on opposite sides thereof by a lateral side 710 and a lateral side 712. Lateral side 712 comprises a hole 714 formed therethrough, wherein a bolt 716 is positioned within hole 714 and hole 213 of mount 202 to secure load 700 to rigging system adaptor 200.

The position of second attachment member 60 relative to linear beam 602 may be adjusted through the release and tightening of pairs of nuts 83 and 85, wherein the release allows second attachment member 60 slidably engaged with proximal lateral rod 140 and with distal lateral rod 142, and the tightening of pairs of nuts 83 and 85 locks second attachment member 60 to proximal lateral rod 140 and to distal lateral rod 142. Additionally, the position of load 700 relative to linear beam 602 be adjusted though the release and tightening of nuts 255, wherein the release allows mount 202 to be slidably engaged with proximal lateral rod 140 and with distal lateral rod 142, and the tightening of nuts 255 locks mount 202 to proximal lateral rod 140 and to distal lateral rod 142.

The invention is an improvement over the devices currently used to lift and support loads. As would occur to one of ordinary skill in the art upon a reading of the present disclosure, the rigging system adaptor disclosed herein allows for the infinite adjustability of load and support point positions in X and Y axes, allowing for a myriad of uses and applications without design or manufacturing of new line arrays. It allows for the ability to quickly and easily control any one of the pan, tilt, and height of the line array while the line array is under load.

While the disclosure has been shown and described with reference to certain preferred embodiments thereof, it will be understood by those skilled in the art that various changes in form and detail may be made therein without departing from the spirit and scope of the disclosure.

What is claimed is:

1. A rigging system adaptor, comprising:
   a main frame having a longitudinally extending body that terminates at an anterior terminal end and an at oppositely situated posterior terminal end, and which further comprises a proximal lateral side oppositely situated to a distal lateral side;
   a proximal lateral rod that is adjacent to and longitudinally extends parallel with the proximal lateral side of the body of the main frame;
   a distal lateral rod that is adjacent to and longitudinally extends parallel with the distal lateral side of the body of the main frame;
   a first attachment member that receives the proximal lateral rod and the distal lateral rod;
   a second attachment member, comprising:
      a sleeve;
      a proximal engagement member that is in physical communication with the sleeve of the second attachment member, and which is slidably engaged with the proximal lateral rod;
      a distal engagement member that is in physical communication with the sleeve of the second attachment member, and which is slidably engaged with the proximal lateral rod; and
      a flange that extends from the sleeve of the second attachment member, wherein the flange has a throughway formed therethrough; and
   a mount, comprising:
      a sleeve comprising a proximal lateral side and an oppositely situated distal lateral side;
      a proximal engagement member in physical communication with the proximal lateral side of the sleeve of the mount and slidably engaged with the proximal lateral rod; and
      a distal engagement member in physical communication with the distal lateral side of the sleeve of the mount and slidably engaged with the distal lateral rod.

2. The rigging system adaptor of claim 1, wherein the first attachment member comprises:
   a plate that receives the proximal lateral rod and the distal lateral rod; and
   a flange that extends from the plate and which comprises a throughway.

3. The rigging system adaptor of claim 2, wherein the plate of the first attachment member abuts the posterior terminal end of the body of the main frame.

4. The rigging system adaptor of claim 3, further comprising a first plate and a second plate, wherein each of the first plate and the second plate abuts the anterior terminal end of the body of the main frame and wherein the first plate receives the proximal lateral rod and the second plate receives the distal lateral rod.

5. A rigging system adaptor, comprising:
   a main frame having a longitudinally extending body that terminates at an anterior terminal end and an at oppositely situated posterior terminal end, and which further comprises a proximal lateral side oppositely situated to a distal lateral side, and an upper side oppositely situated to an underside;
   a proximal lateral rod that is adjacent to and longitudinally extends parallel with the proximal lateral side of the body of the main frame;
   a distal lateral rod that is adjacent to and longitudinally extends parallel with the distal lateral side of the body of the main frame;
   a first attachment member that receives the proximal lateral rod and the distal lateral rod;
   a second attachment member, comprising:
      a sleeve;
      a proximal engagement member that is in physical communication with the sleeve of the second attachment member, and which is slidably engaged with the proximal lateral rod;
      a distal engagement member that is in physical communication with the sleeve of the second attachment member, and which is slidably engaged with the distal lateral rod; and
      a flange that extends from the sleeve of the second attachment member, wherein the flange has a throughway formed therethrough; and
   a mount, comprising:
      a first frame slidably engaged with the proximal lateral rod and the distal lateral rod;
      a second frame slidably engaged with the proximal lateral rod and the distal lateral rod; and
      a sleeve physically engaged with and positioned between the first frame and the second frame and further wherein the sleeve is positioned over the top side of the body of the main frame.

6. The rigging system adaptor of claim 5, wherein the first attachment member comprises:
   a plate that receives the proximal lateral rod and the distal lateral rod; and
   a flange that extends from the plate and which comprises a throughway.

7. The rigging system adaptor of claim 6, wherein the plate of the first attachment member abuts the posterior terminal end of the body of the main frame.

8. The rigging system adaptor of claim 7, further comprising a first plate and a second plate, wherein each of the first plate and the second plate abuts the anterior terminal end of the body of the main frame and wherein the first plate receives the proximal lateral rod and the second plate receives the distal lateral rod.

9. A rigging apparatus, comprising:
a rigging system adaptor, comprising:
- a main frame having a longitudinally extending body that terminates at an anterior terminal end and an at oppositely situated posterior terminal end, and which further comprises a proximal lateral side oppositely situated to a distal lateral side, and an upper side oppositely situated to an underside;
- a proximal lateral rod that is adjacent to and longitudinally extends parallel with the proximal lateral side of the body of the main frame;
- a distal lateral rod that is adjacent to and longitudinally extends parallel with the distal lateral side of the body of the main frame;
- a first attachment member comprising:
  - a plate that receives the proximal lateral rod and the distal lateral rod; and
  - a flange positioned downward from the underside of the main frame,
  wherein the flange has a channel formed therethrough;
- a second attachment member, comprising:
  - a sleeve;
  - a proximal engagement member that is in physical communication with the sleeve of the second attachment member, and which is slidably engaged with the proximal lateral rod;
  - a distal engagement member that is in physical communication with the sleeve of the second attachment member, and which is slidably engaged with the distal lateral rod; and
  - a flange that extends from the sleeve, wherein the flange has a throughway formed therethrough;
- a line array frame;
- a linear beam disposed within the line array frame;
- a first shackle, wherein the first shackle is disposed through the channel of the flange of the first attachment member and physically secured to the linear beam; and
- a second shackle, wherein the second shackle is disposed through the channel of the flange of the second attachment member and physically secured to the linear beam.

10. The rigging apparatus of claim 9, further comprising a load, and wherein the rigging system adaptor further comprises a mount comprising:
- a sleeve comprising a proximal lateral side and an oppositely situated distal lateral side;
- a proximal engagement member in physical communication with the proximal lateral side of the sleeve of the mount and slidably engaged with the proximal lateral rod; and
- a distal engagement member in physical communication with the distal lateral side of the sleeve of the mount and slidably engaged with the distal lateral rod;
wherein the load is held to the sleeve of the mount.

11. The rigging apparatus of claim 10, wherein the plate of the first attachment member physically abuts the posterior terminal end of the body of the main frame.

12. The rigging apparatus of claim 11, further comprising a first plate and a second plate, wherein each of the first plate and the second plate abuts the anterior terminal end of the body of the main frame and wherein the first plate receives the proximal lateral rod and the second plate receives the distal lateral rod.

13. The rigging apparatus of claim 9, further comprising a load, and wherein the rigging system adaptor further comprises a mount comprising:
- a first frame slidably engaged with the proximal lateral rod and the distal lateral rod;
- a second frame slidably engaged with the proximal lateral rod and the distal lateral rod; and
- a sleeve joined to and positioned between the first frame and the second frame and wherein the frame if further disposed over the top side of the body of the main frame, wherein the load is held to the sleeve of the mount.

14. The rigging apparatus of claim 13, wherein the plate of the first attachment member physically abuts the posterior terminal end of the body of the main frame.

15. The rigging apparatus of claim 14, further comprising a first plate and a second plate, wherein each of the first plate and the second plate abuts the anterior terminal end of the body of the main frame and wherein the first plate receives the proximal lateral rod and the second plate receives the distal lateral rod.

* * * * *